United States Patent
Okugami et al.

(10) Patent No.: US 7,334,943 B2
(45) Date of Patent: Feb. 26, 2008

(54) DIFFERENTIAL SUPPORT STRUCTURE, DIFFERENTIAL'S COMPONENT, METHOD OF MANUFACTURING DIFFERENTIAL SUPPORT STRUCTURE, AND METHOD OF MANUFACTURING DIFFERENTIAL'S COMPONENT

(75) Inventors: Kouichi Okugami, Iwata (JP); Yoshinori Muramatsu, Iwata (JP); Chikara Ohki, Kuwana (JP)

(73) Assignee: NTN Corporation, Osaka (JP)

( * ) Notice: Subject to any disclaimer, the term of this patent is extended or adjusted under 35 U.S.C. 154(b) by 84 days.

(21) Appl. No.: 10/787,263

(22) Filed: Feb. 27, 2004

(65) Prior Publication Data

US 2004/0228561 A1  Nov. 18, 2004

(30) Foreign Application Priority Data

Feb. 28, 2003 (JP) ............................ 2003-053150
Feb. 2, 2004 (JP) ............................ 2004-025456

(51) Int. Cl.
*F16C 33/62* (2006.01)
*F16C 33/58* (2006.01)
*C23C 8/32* (2006.01)

(52) U.S. Cl. ............... 384/492; 384/569; 148/319; 148/318

(58) Field of Classification Search .......... 384/571, 384/569, 565, 492, 625, 912; 148/318–319
See application file for complete search history.

(56) References Cited

U.S. PATENT DOCUMENTS

| 3,954,517 A | 5/1976 | Jatczak et al. |
| 4,930,909 A | 6/1990 | Murakami et al. |
| 4,971,634 A | 11/1990 | Shibata et al. |
| 5,129,966 A | 7/1992 | Rao |
| 5,137,375 A | 8/1992 | Murakami et al. |
| 5,180,450 A | 1/1993 | Rao |
| 5,338,377 A | 8/1994 | Mitamura et al. |
| 5,352,303 A | 10/1994 | Murakami et al. |
| 5,375,323 A | 12/1994 | Sata |
| 5,427,457 A | 6/1995 | Furumura et al. |

(Continued)

FOREIGN PATENT DOCUMENTS

DE          4 204 982          8/1993

(Continued)

OTHER PUBLICATIONS

Chinese Official Action issued in corresp. Appln. No. 200410008248.9, dated Apr. 27, 2007.

(Continued)

*Primary Examiner*—Marcus Charles
(74) *Attorney, Agent, or Firm*—McDermott Will & Emery LLP

(57) ABSTRACT

A structure supporting a differential rotatably includes an inner ring arranged at the differential, an outer ring arranged at an external peripheral portion formed to surround the differential, and a tapered roller rolling between the inner ring and the outer ring. At least any one of the inner ring, the outer ring and the tapered roller has a carbo-nitrided layer and provides an austenite grain number falling within a range exceeding 10. Thus the structure can be provided with increased anti-crack strength and dimensional stability, and increased rolling contact fatigue life.

12 Claims, 7 Drawing Sheets

U.S. PATENT DOCUMENTS

| | | | |
|---|---|---|---|
| 5,427,600 | A | 6/1995 | Itoh et al. |
| 5,456,136 | A | 10/1995 | Yamashita et al. |
| 5,456,766 | A | 10/1995 | Beswick et al. |
| 5,595,610 | A | 1/1997 | Maeda et al. |
| 5,611,250 | A | 3/1997 | Narai et al. |
| 5,658,082 | A | 8/1997 | Tsushima et al. |
| 5,772,956 | A | 6/1998 | Hasegawa et al. |
| 5,775,280 | A | 7/1998 | Schmidt et al. |
| 5,803,993 | A | 9/1998 | Yoshida et al. |
| 5,848,846 | A | 12/1998 | Sugiyama et al. |
| 5,853,249 | A | 12/1998 | Maeda et al. |
| 5,944,916 | A | 8/1999 | Chung |
| 5,972,130 | A | 10/1999 | Underys et al. |
| 5,979,383 | A | 11/1999 | Faville et al. |
| 6,012,851 | A | 1/2000 | Hirakawa et al. |
| 6,086,686 | A | 7/2000 | Tanaka et al. |
| 6,095,692 | A | 8/2000 | Takemura |
| 6,149,734 | A | 11/2000 | Isogai et al. |
| 6,158,263 | A | 12/2000 | Maeda et al. |
| 6,165,289 | A | 12/2000 | Matsumoto et al. |
| 6,224,688 | B1 | 5/2001 | Takemura et al. |
| 6,251,198 | B1 | 6/2001 | Koo et al. |
| 6,258,179 | B1 | 7/2001 | Takayama et al. |
| 6,290,398 | B1 | 9/2001 | Fujiwara et al. |
| 6,306,227 | B2 | 10/2001 | Okayama et al. |
| 6,328,009 | B1 | 12/2001 | Brothers |
| 6,342,109 | B1 | 1/2002 | Takemura et al. |
| 6,423,158 | B1 | 7/2002 | Maeda et al. |
| 6,440,232 | B1 | 8/2002 | Takemura et al. |
| 6,447,619 | B1 | 9/2002 | Takayama et al. |
| 6,532,920 | B1 | 3/2003 | Sweetnam et al. |
| 6,582,532 | B1 | 6/2003 | Kurebayashi et al. |
| 6,602,358 | B1 | 8/2003 | Ochi et al. |
| 6,641,680 | B2 | 11/2003 | Nishimori et al. |
| 6,699,335 | B2 | 3/2004 | Murakami et al. |
| 7,147,382 | B2 | 12/2006 | Suzuki et al. |
| 2002/0082133 | A1 | 6/2002 | Yoshikawa et al. |
| 2002/0088511 | A1 | 7/2002 | Nakamura et al. |
| 2003/0040401 | A1 | 2/2003 | Okita et al. |
| 2003/0075244 | A1 | 4/2003 | Kurebayashi et al. |
| 2003/0123769 | A1 | 7/2003 | Ohki |
| 2004/0079310 | A1 | 4/2004 | Suzuki et al. |
| 2004/0170348 | A1 | 9/2004 | Okugami et al. |
| 2005/0045247 | A1 | 3/2005 | Ohki |
| 2005/0205163 | A1 | 9/2005 | Ohki |
| 2007/0034301 | A1 | 2/2007 | Hasegawa et al. |
| 2007/0169850 | A1 | 7/2007 | Ohki et al. |

FOREIGN PATENT DOCUMENTS

| | | |
|---|---|---|
| DE | 1 996 0803 | 6/2000 |
| DE | 1 025 4635 | 6/2003 |
| EP | 0 458 646 A1 | 11/1991 |
| EP | 0 600 421 | 6/1994 |
| EP | 0 626 468 | 11/1994 |
| EP | 0 723 034 | 7/1996 |
| EP | 0 811 789 | 12/1997 |
| EP | 0 950 723 A1 | 10/1999 |
| EP | 1 070 760 A2 | 1/2001 |
| EP | 1 158 064 | 11/2001 |
| EP | 1 273 672 | 1/2003 |
| EP | 1 411 142 A1 | 4/2004 |
| FR | 2 841 907 | 1/2004 |
| GB | 2 258 274 | 2/1993 |
| JP | 63-185917 | 8/1988 |
| JP | 2-125841 | 5/1990 |
| JP | 2-190615 | 7/1990 |
| JP | 4-254574 A | 9/1992 |
| JP | 5-163563 | 6/1993 |
| JP | 5-179350 | 7/1993 |
| JP | 5-263091 | 10/1993 |
| JP | 6-117438 | 4/1994 |
| JP | 6-247253 | 9/1994 |
| JP | 6-286577 | 10/1994 |
| JP | 6-34141 | 12/1994 |
| JP | 7-027139 | 1/1995 |
| JP | 8-4774 | 1/1996 |
| JP | 8-049057 | 2/1996 |
| JP | 9-053148 | 2/1997 |
| JP | 9-176740 | 7/1997 |
| JP | 9-316601 | 12/1997 |
| JP | 9-329139 | 12/1997 |
| JP | 10-030150 | 2/1998 |
| JP | 10-047334 | 2/1998 |
| JP | 10-068419 | 3/1998 |
| JP | 10-103339 | 4/1998 |
| JP | 10-110720 | 4/1998 |
| JP | 10-168515 | 6/1998 |
| JP | 10-184701 | 7/1998 |
| JP | 10-204612 | 8/1998 |
| JP | 11-080897 | 3/1999 |
| JP | 11-101247 | 4/1999 |
| JP | 11-140543 | 5/1999 |
| JP | 11-303874 | 11/1999 |
| JP | 2000-038906 | 2/2000 |
| JP | 2000-038907 | 2/2000 |
| JP | 2000-129347 | 5/2000 |
| JP | 2000-205284 | 7/2000 |
| JP | 2000-212721 | 8/2000 |
| JP | 2001-123244 | 5/2001 |
| JP | 2001-200314 | 7/2001 |
| JP | 2002-031212 | 1/2002 |
| JP | 2002-070872 | 3/2002 |
| JP | 2002-120508 | 4/2002 |
| JP | 2002-180203 | 6/2002 |
| JP | 2002-194438 | 7/2002 |
| JP | 2002-256336 | 9/2002 |
| JP | 2002-339054 | 11/2002 |
| JP | 2003-083337 | 3/2003 |
| JP | 2003-083339 | 3/2003 |
| JP | 2003-156050 | 5/2003 |
| JP | 2003-226918 | 8/2003 |
| JP | 2003-226919 | 8/2003 |
| JP | 2003-287035 | 10/2003 |
| JP | 2003-294034 | 10/2003 |
| WO | WO 91/00929 | 1/1991 |

OTHER PUBLICATIONS

Annual Book of ASTM Standards 2003, vol. 03.01, Designation: E112-96$^{EZ}$: "Standard Test Methods for Determining Average Grain Size", pp. 256-281.

Japanese Office Action, with English translation, issued in Japanese Patent Application No. JP 2002-194775, mailed Mar. 22, 2006.

Japanese Office Action, with English translation, issued in Japanese Patent Application No. JP 2002-194793, mailed Mar. 22, 2006.

Japanese Office Action, with English translation, issued in Japanese Patent Application No. JP 2002-194804, mailed Mar. 20, 2007.

Japanese Office Action, with English translation, issued in Japanese Patent Application No. JP 2002-194804, mailed Nov. 28, 2006.

Japanese Office Action, with English translation, issued in Japanese Patent Application No. JP 2002-194921, mailed Nov. 28, 2006.

Japanese Office Action, with English translation, issued in Japanese Patent Application No. JP 2002-303036, mailed Apr. 25, 2006.

Japanese Office Action, with English translation, issued in Japanese Patent Application No. JP 2002-303036, mailed Oct. 24, 2006.

Japanese Office Action, with English translation, issued in Japanese Patent Application No. JP 2003-209737, mailed Feb. 6, 2007.

European Search Report issued in European Patent Application No. EP 05 70 3409, mailed Apr. 4, 2007.

Burrier, H., "Hardenability of Carbon and Low-Alloy Steels", ASM International, 2002.

Vander Voort, G., "Embrittlement of Steels", ASM International, 2002.

Kim, C., et al., "Influence of Subzero and Shot-Peening Treatments on Impact and Fatigue Fracture Properties of Case-Hardened Steels", Journal Heat Treat., Jun. 1981, pp. 43-53, v 2, n 1.

JIS G 0551 Methods of Austenite Grain Size Determination for Steel, 2002, Tokyo Japan.

JIS Z 2202 Test Pieces for Impact Test for Metallic Materials, 2002, Tokyo Japan.

JIS Z 2242 Method of Impact Test for Metallic Materials, 2002, Tokyo Japan.

DIFFERENTIAL SUPPORT STRUCTURE, DIFFERENTIAL'S COMPONENT, METHOD OF MANUFACTURING DIFFERENTIAL SUPPORT STRUCTURE, AND METHOD OF MANUFACTURING DIFFERENTIAL'S COMPONENT

BACKGROUND OF THE INVENTION

1. Field of the Invention

The present invention relates generally to differential support structures, differentials' components, methods of manufacturing differential support structures, and methods of manufacturing differentials' components, and particularly to differential support structures, differentials' components, methods of manufacturing differential support structures, and method of manufacturing differentials' components that allow increased life against fatigue.

2. Description of the Background Art

Deep groove ball bearings, tapered roller bearings and other similar rolling bearings are formed of rolling elements, bearing rings and cages. When the rolling elements roll between the bearing rings, the rolling elements contact the bearing rings at a point or linearly. As such, while the bearing's projected area is small, a large load bearing capacity and high rigidity can advantageously be obtained. As such, rolling bearings are suitable for support structures used under severe conditions such as reduced lubrication, operation at high rotation rates, and the like, and for example used in a structure supporting an automobile's differential.

In such an automobile's differential support structure the bearing's components are fatigued as they rotate. To increase the components in life, a thermal treatment is performed. Specifically, for example, in quenching the components they are heated in an ambient RX gas with ammonium gas further introduced therein to carbo-nitride their surface layer portion, for example as disclosed in Japanese Patent Laying-Open Nos. 8-4774 and 11-101247. This carbo-nitriding process can harden the surface layer portion and generate retained austenite in a microstructure to provide increased rolling contact fatigue life.

However, an automobile differential support structure carries radial load based mainly on gravity. Furthermore in the automobile differential support structure a pinion gear and a side gear are prevented from meshing at a varied position by exerting a considerable radial load on rolling elements supporting the differential. Furthermore in the automobile differential support structure the pinion and side gears fit with a helix angle. This results in thrust load. Furthermore to allow the pinion and side gears' fitted portion to be quiet a considerable thrust preload is exerted on the rolling elements supporting the differential. These loads are combined and the rolling elements supporting the differential carry a considerable thrust load. In order to obtain sufficient rolling fatigue characteristic the structure needs to have a sufficient large size, which is an obstacle to reducing the differential in size.

Furthermore, the above-mentioned carbo-nitriding process is a process to diffuse carbon and nitrogen. This requires a high temperature maintained for a long period of time. As such, for example a coarsened structure results and increased anti-crack strength is hardly obtained. Furthermore, as more austenite is retained, secular dimensional variation rate increases, which is also an obstacle to providing increased life.

Against rolling fatigue, an increased life can be ensured, an enhanced anti-crack strength provided and an increased secular dimensional variation avoided by relying on designing a steel alloy to provide an adjusted composition. Relying on designing the alloy, however, increases source material cost disadvantageously.

As future bearings will be used in environments exerting large loads at high temperatures, the bearings will be required to be operable under larger loads at higher temperatures than conventional. As such, there is a demand for a bearing having large strength, long life against rolling contact fatigue, and large anti-crack strength and dimensional stability. Furthermore there is also a demand for not only a bearing component in a differential support structure but also a gear, a shaft and other components of the differential that allow long life against fatigue.

SUMMARY OF THE INVENTION

The present invention contemplates a differential support structure, a component of a differential, a method of manufacturing the differential support structure, and a method of manufacturing the component of the differential that allow increased life against fatigue.

The present invention in one aspect provides a structure supporting a differential rotatably, including: an inner ring arranged at the differential; an outer ring arranged at an external peripheral portion formed to surround the differential; and a rolling element rolling between the inner ring and the outer ring, wherein at least one of the inner ring, the outer ring and the rolling element has a nitrogen enriched layer and has an austenite grain number falling within a range exceeding 10.

In accordance with the present invention in one aspect at least any one of the inner ring, the outer ring and the rolling element that provides a small austenite grain size allows significantly increased anti-crack strength, dimensional stability and rolling contact fatigue life. Furthermore this also allows the differential support structure and hence the differential to be reduced in size. With the austenite grain size number of 10 or less, any remarkable improvement of the rolling fatigue life is impossible and thus the grain size number is greater than 10, and preferably 11 or greater. Although further finer austenite grains are desirable, the grain size number exceeding 13 is usually difficult to achieve. Note that the above described nitrogen enriched layer is formed by a carbonitriding process as will be described hereinafter. The nitrogen enriched layer may or may not be enriched with carbon. The inner ring, outer ring and/or rolling element's austenite grain does not vary whether it may be in a surface layer portion significantly affected as it is carbo-nitrided or a portion inner than the surface layer portion. As such, the surface layer portion and the inner portion will be set as positions serving as subjects of the aforementioned grain number range. Also note that the austenite grains refer to crystal grains of austenite which is phase-transformed during the heating process, and the traces of grains remain after the austenite is transformed into martensite through cooling.

The present invention in another aspect provides a structure supporting a differential rotatably, including: an inner ring arranged at the differential; an outer ring arranged at an external peripheral portion formed to surround the differential; and a rolling element rolling between the inner ring and the outer ring, wherein at least one of the inner ring, the outer ring and the rolling element has a nitrogen enriched layer and provides a fracture stress value of no less than 2650 MPa.

The present inventors have found that steel that is carbonitrided at a temperature exceeding an $A_1$ transformation point and then cooled to a temperature of less than the $A_1$ transformation point, and subsequently reheated to a range of temperature higher than the $A_1$ transformation point and is quenched, can be provided with a nitrogen enriched layer allowing the steel to provide a fracture stress value of no less than 2650 MPa, which has conventionally not been achieved. A differential support structure superior in fracture stress to conventional and thereby larger in strength can thus be obtained.

The present invention in still another aspect provides a structure supporting a differential rotatably, including: an inner ring arranged at the differential; an outer ring arranged at an external peripheral portion formed to surround the differential; and a rolling element rolling between the inner ring and the outer ring, wherein at least one of the inner ring, the outer ring and the rolling element has a nitrogen enriched layer and has a hydrogen content of no more than 0.5 ppm.

The present invention in still another aspect can alleviate embrittlement of steel attributed to hydrogen. If steel has a hydrogen content exceeding 0.5 ppm the steel has reduced anti-crack strength. Such a steel is insufficiently suitable for a differential support structure experiencing heavy loads. A lower hydrogen content is desirable. However, reduction of the hydrogen content to the one less than 0.3 ppm requires long-term heat treatment, resulting in increase in size of austenite grains and thus deterioration in toughness. Then, a hydrogen content is desirably in a range from 0.3 to 0.5 ppm and more desirably in a range from 0.35 to 0.45 ppm.

In measuring the above hydrogen content, diffusible hydrogen is not measured and only the non-diffusible hydrogen released from the steel at a predetermined temperature or higher is measured. Diffusible hydrogen in a sample of small size is released from the sample to be scattered even at room temperature, and therefore the diffusible hydrogen is not measured. Non-diffusible hydrogen is trapped in any defect in the steel and only released from the sample at a predetermined heating temperature or higher. Even if only the non-diffusible hydrogen is measured, the hydrogen content considerably varies depending on the method of measurement. The above mentioned range of hydrogen content is determined by thermal conductimetry. In addition, as detailed later, the measurement may be taken by means of a LECO DH-103 hydrogen determinator or like measuring device.

In the differential support structure preferably the differential is held by a tapered roller bearing or a deep groove ball bearing rotatably.

This allows a simple structure to be used to configure the differential support structure and can also provide the structure with increased anti-crack strength and dimensional stability and increased rolling contact fatigue life.

The present invention in one aspect provides a component of a differential including a gear capable of operating two wheels at different rates, respectively, and a shaft linked to the gear. The component has a nitrogen enriched layer and an austenite grain size number exceeding 10.

The component that contains austenite grains having a small diameter allows a significant improvement in anti-crack strength, dimensional stability, and life against fatigue for the same reason as set forth for the differential support structure.

The present invention in another aspect provides a component of a differential including a gear capable of operating two wheels at different rates, respectively, and a shaft linked to the gear. The component has a nitrogen enriched layer and provides a fracture stress value of no less than 2650 MPa.

A differential superior in fracture stress value to conventional and hence stronger than conventional can thus be obtained for the same reason as set forth for the differential support structure.

The present invention in still another aspect provides a component of a differential including a gear capable of operating two wheels at different rates, respectively, and a shaft linked to the gear. The component has a nitrogen enriched layer and a hydrogen content of no more than 0.5 ppm.

Thus, hydrogen attributed, steel embrittlement can be reduced for the same reason as set forth for the differential support structure.

The present invention provides a method of manufacturing a structure supporting a differential rotatably, including an inner ring arranged at the differential, an outer ring arranged at an external peripheral portion formed to surround the differential, and a rolling element rolling between the inner ring and the outer ring, wherein steel is carbo-nitrided at a temperature higher than an $A_1$ transformation point and then cooled to a temperature lower than the $A_1$ transformation point, and the steel is subsequently again heated to a range of temperature of no less than the $A_1$ transformation point and less than the temperature applied to carbo-nitride the steel and the steel is then quenched to produce at least any one of the inner ring, the outer ring and the rolling element.

The present invention provides a method of manufacturing a component of a differential including a gear capable of operating two wheels at different rates, respectively, and a shaft linked to the gear. Steel is carbo-nitrided at a temperature higher than an $A_1$ transformation point and then cooled to a temperature lower than the $A_1$ transformation point, and the steel is subsequently again heated to a range of temperature of no less than the $A_1$ transformation point and less than the temperature applied to carbo-nitride the steel and the steel is then quenched to produce the component.

In the present method of manufacturing a structure supporting a differential and that of manufacturing a component of a differential after steel is carbo-nitrided the steel is cooled to a temperature of less than the $A_1$ transformation point before it is finally quenched. A fine austenite grain size can be obtained and as a result, Charpy impact, fracture toughness, anti-crack strength, life against fatigue and the like can be improved.

Furthermore for example by cooling to a temperature at which austenite transforms, austenite grain boundary in carbo-nitriding can be irrelevant to that in final quenching. Furthermore, The final quenching temperature is lower than the carbonitriding temperature, and thus the amount of un-dissolved cementite in the surface layer, which is influenced by the carbonitriding process, increases as compared with that in the carbonitriding process. As such the ratio of un-dissolved cementite increases while the ratio of austenite decreases at the heating temperature in the final quenching as compared with those ratios in the carbonitriding process. In addition, it is seen from the Fe—C binary phase diagram that, in the range where cementite and austenite coexist, the concentration of carbon in solid solution of the carbon and austenite decreases as the quenching temperature decreases.

When the temperature is increased to the final quenching temperature, austenite grains are made fine since there remain a large amount of un-dissolved cementite that prevent growth of austenite grains. Moreover, the structure transformed from austenite to martensite through quenching has a low carbon concentration, so that the structure has high toughness as compared with the structure quenched from the carbonitriding temperature.

In the present method of manufacturing a structure supporting a differential and that of manufacturing a component of a differential preferably the steel is heated to a range of temperature of 790° C. to 830° C. before it is quenched.

The steel is again heated to a temperature hardly allowing an austenite grain to be grown before the steel is quenched. Fine austenite grain size can thus be achieved.

An austenite crystal grain may be any austenite crystal grain having a grain boundary that can be observed after being subjected to a process manifesting a grain boundary such as an etching process for a metal phase sample of the member of interest. The austenite crystal grain can be referred to as a prior austenite grain in that it has a grain boundary just heated and ready to be subjected to low-temperature quenching. For measurement of the grain size, the average of JIS-defined grain size numbers may be converted to obtain an average grain diameter, or the intercept method or the like may be used in which a straight line is placed on a metal phase structure in an arbitrary direction to obtain an average length between points at which the straight line meets grain boundaries.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Reference will now be made to the drawings to describe the present invention in embodiments.

First Embodiment

Figure 1:
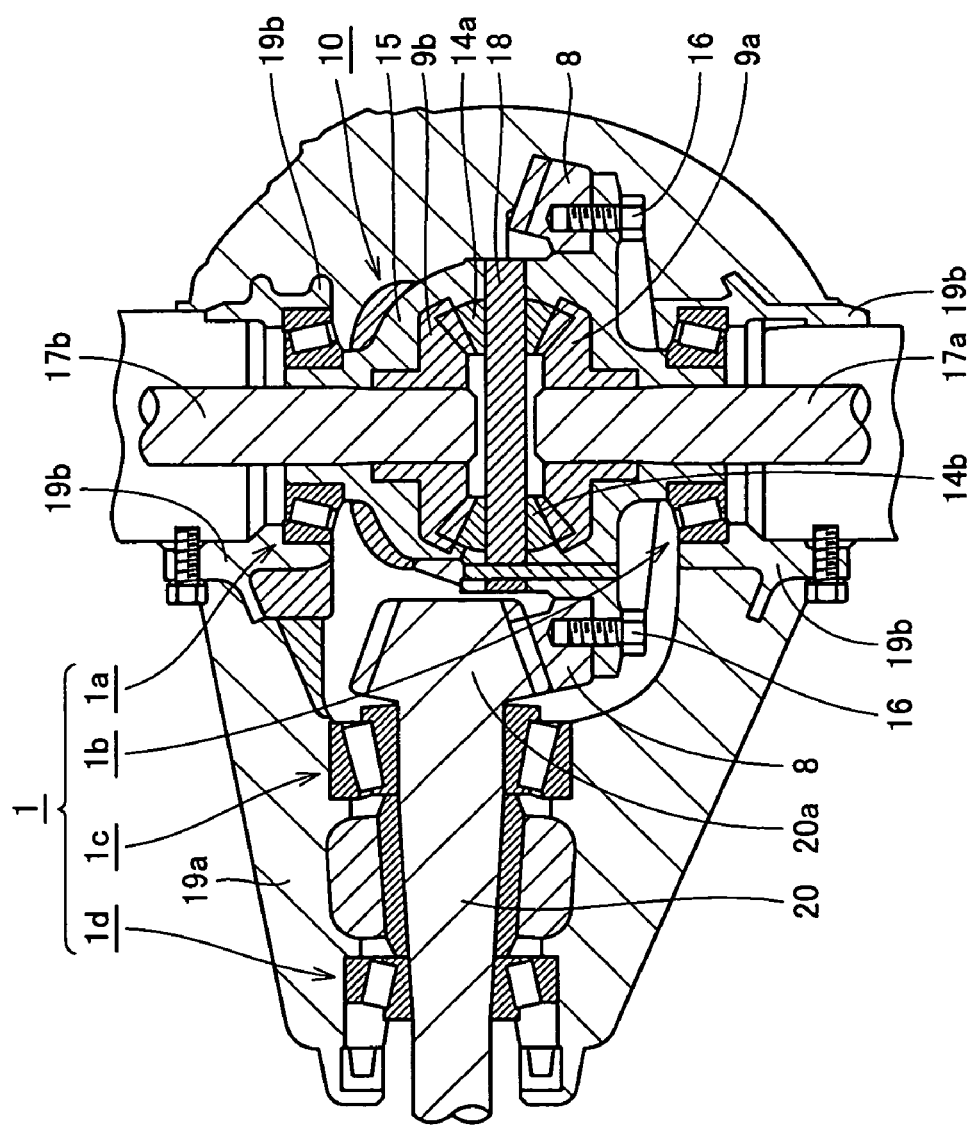
FIG. 1A is a schematic cross section of a differential support structure of the present invention in a first embodiment and FIG. 1B is a schematic cross section of a tapered roller bearing corresponding to the differential support structure of the present invention in the first embodiment.

With reference to FIG. 1A, a differential 10, and external peripheral portions 19a, 19b surrounding differential 10 are shown. Differential 10 meshes with a drive pinion 20 extending leftward as seen in the figure. Drive pinion 20 rotates to transmit power to differential 10. Furthermore differential 10 has axle shafts 17a, 17b linked thereto vertically as seen in the figure. Axle shafts 17a, 17b rotate as they receive power from drive pinion 20. A differential support structure 1 supports the differential 10 drive pinion 20 and axle shafts 17a, 17b rotatably relative to external peripheral portions 19a, 19b or other similar fixed members.

Differential 10 mainly has drive pinion 20, axle shafts 17a and 17b, a pinion shaft 18, a ring gear 8, pinion gears 14a and 14b, side gears 9a and 9b, and a differential case 15. Axle shaft 17a, 17b each has an end with two wheels (not shown) connected thereto. Ring gear 8, pinion gears 14a and 14b, and side gears 9a and 9b configure a gear of differential 10 for operating two wheels at different rates, respectively. Axle shafts 17a and 17b and pinion shaft 18 configure a shaft of differential 10.

Ring gear 8 is secured to case 15 by a bolt 16 and meshes with a drive pinion gear 20a provided at an end of drive pinion 20. In case 15, pinion gears 14a and 14b and side gears 9a and 9b are arranged. Case 15 has a pinion shaft 18 linked thereto and pinion gears 14a and 14b are each fit into pinion shaft 18. Thus ring gear 8 and pinion gears 14a and 14b are linked to pinion shaft 18. Pinion gears 14a and 14b are, as seen in the figure, arranged at right and left hands opposite to each other and revolvable around pinion shaft 18. Side gears 9a and 9b are, as seen in the figure, arranged vertically opposite to each other. Side gears 9a and 9b each mesh with each of pinion gears 14a and 14b. Side gears 9a and 9b are, as seen in the figure, linked to the lower and upper axle shafts 17a and 17b, respectively.

In the present embodiment the differential operates as will be described hereinafter.

As drive pinion 20 rotates, power is transmitted to ring gear 8 and received to allow differential case 15, ring gear 8, pinion gears 14a and 14b, side gears 9a and 9b, and axle shafts 17a and 17b to integrally rotate around axle shafts 17a and 17b.

Herein for example if in the present embodiment differential 10 is applied to an automobile and the automobile proceeds on a flat road straight ahead, the two axle shafts 17a and 17b equally experience resistance. Accordingly in case 15 pinion gears 14a and 14b and side gears 9a and 9b each do not revolve. Thus the two axle shafts 17a and 17b rotate at the same rate of rotation.

In contrast, when the automobile turns or runs on a rough road the two axle shafts 17a and 17b experience different resistances. This difference in resistance causes pinion gears 14a and 14b to revolve around pinion shaft 18. Accordingly the reduction in the rotation of the side gear (side gear 9a for example) linked to the axle shaft experiencing the larger resistance (axle shaft 17a for example) is distributed to the side gear linked to the axle shaft experiencing the smaller resistance (side gear 9b for example). As a result, axle shaft 17b experiencing the smaller resistance has a larger rate of rotation than axle shaft 17a experiencing the larger resistance to transmit power so that the two wheels connected to each of axle shafts 17a, 17b operate at different rates, respectively.

In the present embodiment differential 10 is formed of a component (drive pinion 20, axle shafts 17a and 17b, pinion shaft 18, ring gear 8, pinion gears 14a and 14b, side gears 9a and 9b, and differential case 15) having a nitrogen enriched layer and an austenite grain size number exceeding 10.

In the present embodiment differential 10 is formed of a component (drive pinion 20, axle shafts 17a and 17b, pinion shaft 18, ring gear 8, pinion gears 14a and 14b, side gears 9a and 9b, and differential case 15) having a nitrogen enriched layer and providing a fracture stress value of no less than 2650 MPa.

In the present embodiment differential 10 is formed of a component (drive pinion 20, axle shafts 17a and 17b, pinion shaft 18, ring gear 8, pinion gears 14a and 14b, side gears 9a and 9b, and differential case 15) having a nitrogen enriched layer and a hydrogen content of no more than 0.5 ppm.

With reference to FIGS. 1A and 1B the present embodiment provides differential support structure 1 formed of a tapered roller bearing 1a arranged between the differential 10 upper end portion, as seen in the figure, and external peripheral portion 19b, a tapered roller bearing 1b arranged between the differential 10 lower end portion, as seen in the figure, and external peripheral portion 19b, and tapered roller bearings 1c and 1d arranged between drive pinion 20 and external peripheral portion 19a.

Tapered roller bearing 1a includes an outer ring 2a, an inner ring 3a, a tapered roller 4a, and a cage 5a. Outer ring 2a is arranged at an upper, internal peripheral surface of external peripheral portion 19b. Inner ring 3a is arranged fitted at an upper end portion of differential 10. Tapered roller 4a is fixed between outer ring 2a and inner ring 3a, held by cage 5a to be rolled. Tapered roller bearing 1b includes an outer ring 2b, an inner ring 3b, a tapered roller 4b, and a cage 5b. Outer ring 2b is arranged at a lower, internal peripheral surface of external peripheral portion 19b. Inner ring 3b is arranged fitted at a lower end portion of differential 10. Tapered roller 4b is fixed between outer ring 2b and inner ring 3b, held by cage 5b to be rolled. Tapered roller bearings 1c and 1d include outer rings 2c and 2d, inner rings 3c and 3d, tapered rollers 4c and 4d, and cages 5c and 5d. Outer rings 2c and 2d are arranged at an internal peripheral surface of external peripheral portion 19a. Inner rings 3c and 3d are arranged fitted at drive pinion 20. Tapered rollers 4c and 4d are fixed between outer rings 2c and 2d and inner rings 3c and 3d, held by cages 5c and 5d to be rolled as desired.

In the present embodiment differential support structure 1 has at least one of inner rings 3a-3d, outer rings 2a-2d and tapered rollers 4a-4d having a nitrogen enriched layer and providing an austenite grain number falling within a range exceeding 10.

In the present embodiment differential support structure 1 has at least one of inner rings 3a-3d, outer rings 2a-2d and tapered rollers 4a-4d having a nitrogen enriched layer and allowing a fracture stress of no less than 2650 MPa.

In the present embodiment differential support structure 1 has at least one of inner rings 3a-3d, outer rings 2a-2d and tapered rollers 4a-4d having a nitrogen enriched layer and a hydrogen content of no more than 0.5 ppm.

Description will now be provided of a thermal treatment including carbo-nitriding at least one of inner rings 3a-3d, outer rings 2a-2d and tapered rollers 4a-4d that configure differential support structure 1, or a component of differential 10.

Figure 2:
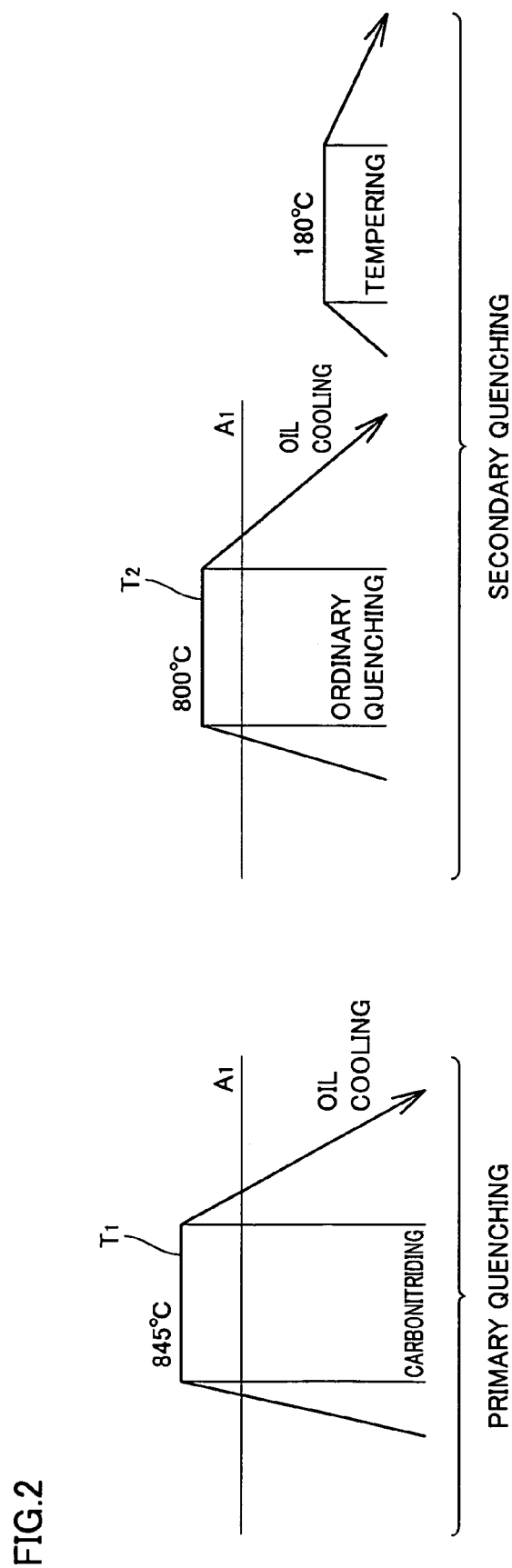
FIG. 2 is a diagram for illustrating a method of a thermal treatment in the first embodiment.
Figure 3:
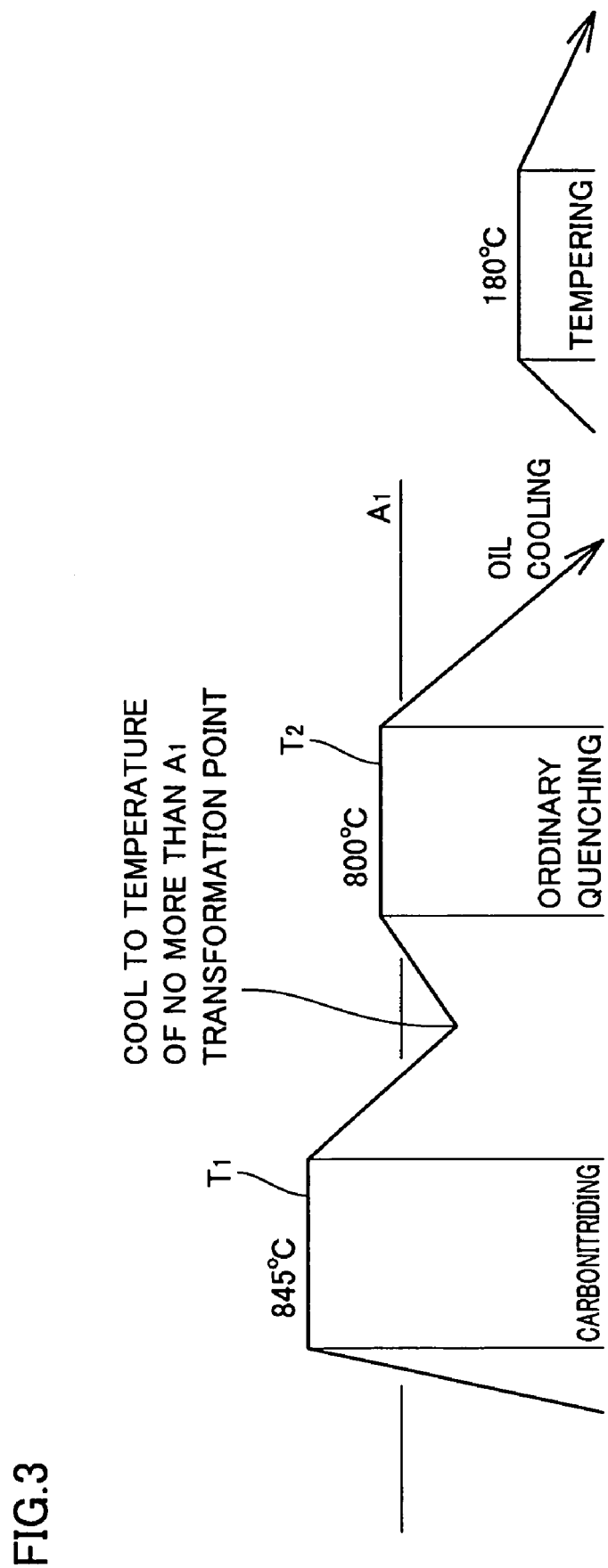
FIG. 3 is a diagram for illustrating an exemplary variation of the method of the thermal treatment in the first embodiment.

FIG. 2 shows a heat treatment pattern according to which primary quenching and secondary quenching are carried out, and FIG. 3 shows a heat treatment pattern according to which a material is cooled to a temperature lower than the $A_1$ transformation point in a quenching process and thereafter heated again to be finally quenched. Both are exemplary embodiments of the present invention. Referring to these drawings, in process $T_1$, carbon and nitrogen are diffused through a steel matrix while the carbon is sufficiently dissolved therein, and thereafter cooling is done to a temperature below the $A_1$ transformation point. Then, in process $T_2$ shown in the drawings, heating is done again to a temperature lower than that in process $T_1$ and then oil-quenching is performed.

Compared with ordinary or normal quenching by which carbonitriding is done and immediately thereafter quenching is done once, the above-discussed heat treatment can provide enhanced the crack strength and reduced secular dimensional variation rate while carbonitriding the surface layer of material. This heat treatment can also produce a microstructure having austenite crystal grains of a grain size which is smaller than the conventional one by one half or more. As such, differential support structure 1 in the present embodiment that is thermally processed as described above can obtain increased rolling contact fatigue life and enhanced crack strength and reduced secular dimensional variation rate. Furthermore the component of differential 10 in the present embodiment that is thermally treated as described above allows differential 10 to have an increased life against fatigue, increased anti-crack strength, and a reduced secular dimensional variation rate.

If hydrogen content alone is desired to fall within the range of the present invention, it is not necessary to set a temperature for $T_2$, i.e., a secondary quenching temperature to be lower than a carbo-nitriding, heating temperature $T_1$ (or a primary quenching temperature) and secondary quenching temperature $T_2$ may be equal to or higher than primary quenching temperature $T_1$. In other words, if $T_2$ is higher than $T_1$, a hydrogen content that falls within the range of the present invention can still be obtained. By setting the secondary quenching temperature to be lower than the primary quenching temperature, however, a reduced hydrogen content can be achieved and in addition an austenite grain size number that exceeds ten can be achieved. As such, desirably $T_2$ is less than $T_1$.

The above-described thermal treatments both allow their carbo-nitriding processes to produce a nitrogen enriched layer that is a "carbo-nitrided layer." Since the material for the carbo-nitriding process, the steel, has a high concentration of carbon, carbon in the atmosphere of the normal carbo-nitriding process might not enter the surface of the steel easily. For example, with steel having a high concentration of carbon (approximately 1% by weight), a carburized layer may have a higher concentration of carbon than this value, or a carburized layer may be formed without having a higher concentration of carbon than this value. A concentration of nitrogen in normal steel, however, is typically as low as approximately no more than 0.025 wt % at the maximum although it depends on a concentration of Cr or the like. Therefore, a nitrogen-enriched layer can apparently be formed regardless of the concentration of carbon in source steel. It will be appreciated that the above-described nitrogen-enriched layer may also be enriched with carbon.

Figure 4A:
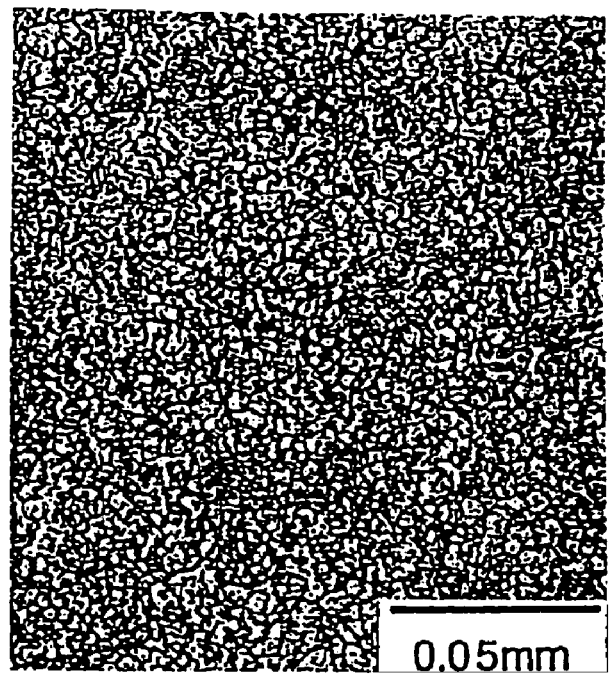
FIG. 4A shows a microstructure, an austenite grain in particular, of a member of a differential support structure, as seen in a bearing component of an example of the present invention.
Figure 4B:
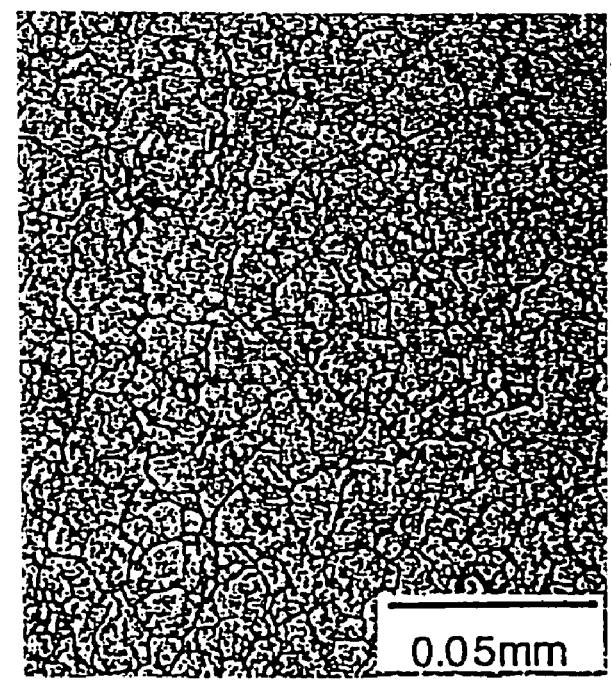
FIG. 4B shows that as seen in a conventional bearing component.
Figure 5A:
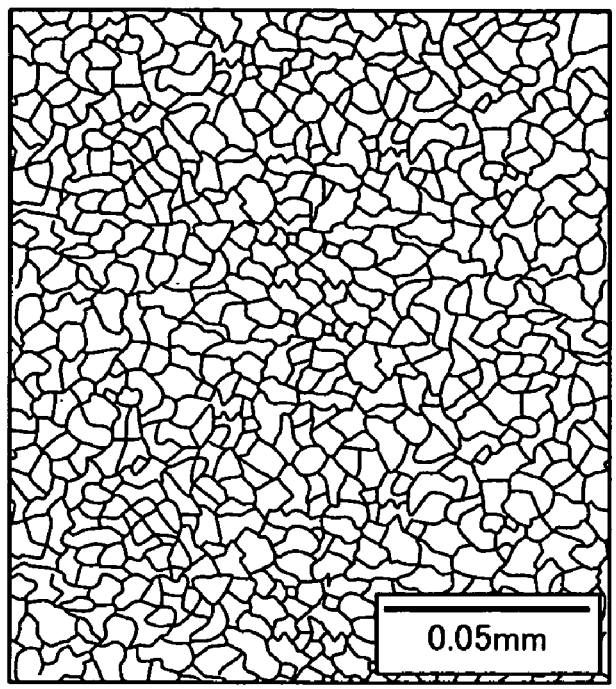
FIG. 5A shows an austenite grain boundary illustrating FIG. 4A.
Figure 5B:
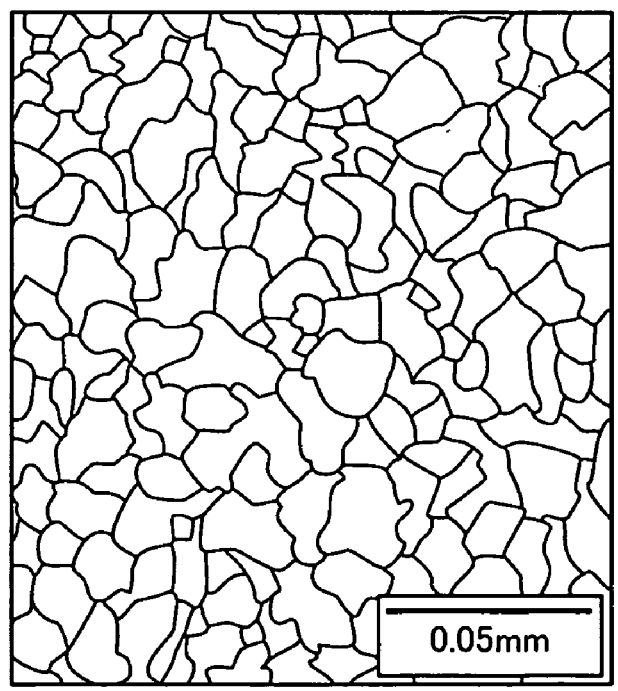
FIG. 5B shows that illustrating FIG. 4B.

FIGS. 4A and 4B show a microstructure of a member of the differential support structure, particularly austenite grains. FIG. 4A shows a bearing component of the present invention and FIG. 4B shows a bearing component of a conventional bearing component. Namely, FIG. 4A shows a grain size of austenite of a bearing steel having been heat-treated as shown in FIG. 2. For comparison, FIG. 4B shows a grain size of austenite of a bearing steel which has undergone the conventional heat treatment. FIGS. 5A and 5B diagrammatically show the grain sizes of austenite that are shown in FIGS. 4A and 4B. In the structures with the crystal grain sizes of austenite, the grain diameter of the conventional austenite is 10 which is a grain size number defined by JIS while that of the present invention through the heat treatment thereof is 12 and thus fine grains are seen. Further, the average grain diameter in FIG. 4A is 5.6 µm measured by the intercept method.

Second Embodiment

Figure 6:
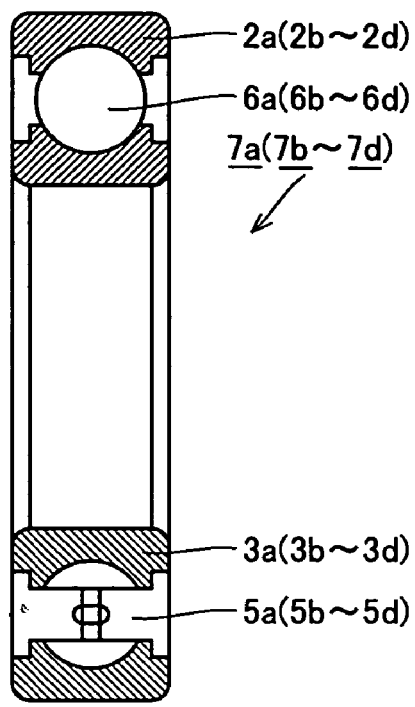
FIG. 6 is a schematic cross section of a deep groove ball bearing corresponding to a differential support structure of the present invention in a second embodiment.

With reference to FIG. 6, the present embodiment provides differential support structure 1 with tapered roller bearings 1a-1d replaced with deep groove ball bearings 7a-7d.

Deep groove ball bearing 7a includes an outer ring 2a, an inner ring 3a, a ball 6a, and a cage 5a. Outer ring 2a is arranged at an upper, internal peripheral surface of external peripheral portion 19b (see FIG. 1A). Inner ring 3a is arranged fitted at an upper end portion of differential 10. Ball 6a is fixed between outer ring 2a and inner ring 3a, held by cage 5a to be rolled. Deep groove ball bearing 7b includes an outer ring 2b, an inner ring 3b, a ball 6b, and a cage 5b.

Outer ring 2b is arranged at a lower, internal peripheral surface of external peripheral portion 19b. Inner ring 3b is arranged fitted at a lower end portion of differential 10. Ball 6a is fixed between outer ring 2b and inner ring 3b, held by cage 5b to be rolled. Deep groove ball bearing 7c and 7d include outer rings 2c and 2d, inner rings 3c and 3d, balls 6c and 6d, and cages 5c and 5d. Outer rings 2c and 2d are arranged at an internal peripheral surface of external peripheral portion 19a (see FIG. 1A). Inner rings 3c and 3d are arranged fitted at drive pinion 20 (see FIG. 1A). Balls 4c and 4d are fixed between outer rings 2c and 2d and inner rings 3c and 3d, held by cages 5c and 5d to be rolled as desired.

The remainder of the configuration is substantially identical to that described in the first embodiment with reference to FIGS. 1A and 1B. Accordingly, like components are labeled identically and will not be described.

In the present embodiment differential support structure 1 has at least one of inner rings 3a-3d, outer rings 2a-2d and balls 6a-6d having a nitrogen enriched layer and providing an austenite grain number falling within a range exceeding 10.

In the present embodiment differential support structure 1 has at least one of inner rings 3a-3d, outer rings 2a-2d and balls 6a-6d having a nitrogen enriched layer and allowing a fracture stress of no less than 2650 MPa.

In the present embodiment differential support structure 1 has at least one of inner rings 3a-3d, outer rings 2a-2d and balls 6a-6d having a nitrogen enriched layer and a hydrogen content of no more than 0.5 ppm.

EXAMPLES

The present invention in examples will now be described.

Example 1

JIS-SUJ2 (1.0 wt % of C-0.25 wt % of Si-0.4 wt % of Mn-1.5 wt % of Cr) was used for Example 1 of the present invention. Samples shown in Table 1 were each produced through the procedure described below.

TABLE 1

| | samples | | | | | | | |
|---|---|---|---|---|---|---|---|---|
| | A | B | C | D | E | F | conventionally carbonitrided product | normally quenched product |
| secondary quenching temp. (° C.) | 780[1)] | 800 | 815 | 830 | 850 | 870 | — | — |
| hydrogen content (ppm) | — | 0.37 | 0.40 | 0.38 | 0.42 | 0.40 | 0.72 | 0.38 |
| grain size no. (JIS) | — | 12 | 11.5 | 11 | 10 | 10 | 10 | 10 |
| Charpy impact value (J/cm$^2$) | — | 6.65 | 6.40 | 6.30 | 6.20 | 6.30 | 5.33 | 6.70 |
| fracture stress value (MPa) | — | 2840 | 2780 | 2650 | 2650 | 2700 | 2330 | 2770 |
| Rolling contact fatigue life ratio ($L_{10}$) | — | 5.4 | 4.2 | 3.5 | 2.9 | 2.8 | 3.1 | 1 |

[1)]Not evaluated this time due to insufficient quenching.

Samples A-D: Examples of the Present Invention

Carbonitriding was performed at 850° C. held for 150 minutes in an atmosphere of a mixture of RX gas and ammonia gas. Following the heat treatment pattern shown in FIG. 6, primary quenching was done from a carbonitriding temperature of 850° C., and secondary quenching was subsequently done by heating to a temperature in a temperature range from 780° C. to 830° C. lower than the carbonitriding temperature. Sample A with a secondary quenching temperature of 780° C. was not tested since quenching of sample A was insufficient.

Samples E and F: Comparative Examples

These samples were carbonitrided through the same procedure as that of samples A-D of the present invention, and then secondary quenched at a temperature from 850° C. to 870° C. equal to or higher than the carbonitriding temperature of 850° C.

Conventional Carbonitrided Sample: Comparative Example

Carbonitriding was performed at 850° C. held for 150 minutes in an atmosphere of a mixture of RX gas and ammonia gas. Quenching was successively done from the carbonitriding temperature and no secondary quenching was done.

Normal Quenched Sample: Comparative Example

Without carbonitriding, quenching was done by increasing the temperature to 850° C. and no secondary quenching was done.

For the samples above, tests were conducted for (1) measuring the amount of hydrogen, (2) measuring crystal grain size, (3) Charpy impact test, (4) measuring fracture stress and (5) rolling fatigue test, by the methods described below.

I. Test Methods for Example 1

(1) Measurement of Hydrogen Amount

The amount of hydrogen was determined by means of a DH-103 hydrogen determinator manufactured by LECO Corporation to analyze the amount of non-diffusible hydrogen in a steel. The amount of diffusible hydrogen was not measured. Specifications of the LECO DH-103 hydrogen determinator are as follows.

Analysis range: 0.01-50.00 ppm
Analysis precision: ±0.1 ppm or ±3% H (higher one)
Analysis sensitivity: 0.01 ppm
Detection method: thermal conductimetry
Sample weight size: 10 mg-35 g (max: 12 mm (diameter)×100 mm (length))
Furnace temperature range: 50° C.-1100° C.
Reagent: anhydron $Mg(ClO_4)_2$, Ascarite and NaOH
Carrier gas: nitrogen gas
Dosing gas: hydrogen gas
(Both gases have a purity of at least 99.99% and a pressure of 40 PSI (2.8 kgf/cm$^2$).)

The procedure of the analysis is roughly described here. A sample was taken by a dedicated sampler and the sample together with the sampler was put into the hydrogen determiner. Diffusible hydrogen therein was directed by the nitrogen carrier gas to a thermal conductimetry detector. The diffusible hydrogen was not measured in this example. Then, the sample was taken out of the sampler to be heated in a resistance heater and non-diffusible hydrogen was directed by the nitrogen carrier gas to the thermal conductimetry detector. The thermal conductivity was measured by the thermal conductimetry detector to determine the amount of non-diffusible hydrogen.

(2) Measurement of Crystal Grain Size

The crystal grain size was measured according to the method of testing the crystal grain size of austenite in a steel defined by JIS G 0551.

(3) Charpy Impact Test

A Charpy impact test was conducted according to the Charpy impact test method for a metal material defined by JIS Z 2242. A test piece used here was a U-notch test piece (JIS No. 3 test piece) defined by JIS Z 2202.

Note that a Charpy impact value is a value of absorption energy E, as described below, that is divided by cross section (0.8 cm$^2$).

Absorption energy E=WgR (cos β−cosα)
Hammer weight W=25.438 kg
Gravitational acceleration g=9.80665 m/sec$^2$
Distance R from center of axis of rotation of hammer to center of gravity=0.6569 m
Hammer lifted by angle α=146°
Hammer moved upward and downward by angle β

(4) Measurement of Fracture Stress

Figure 7:
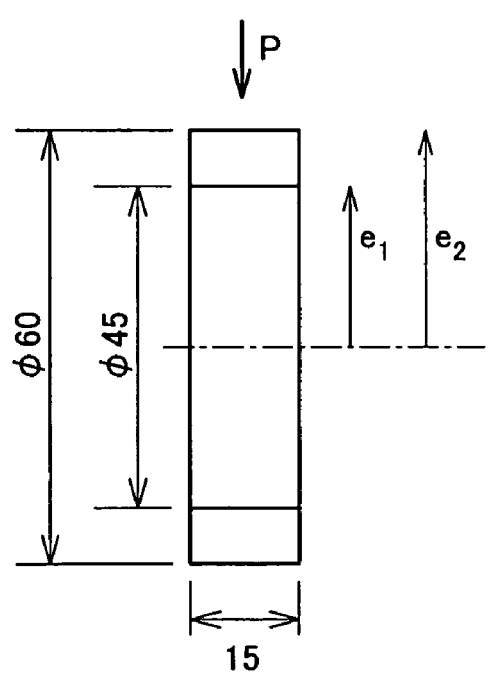
FIG. 7 shows a sample used in a static pressure fracture strength test (to measure fracture stress)

A load was exerted in direction P in FIG. 7 and the load when the test piece was fractured was measured. Then, the measured load which was a fracture load was converted into a stress by the following stress calculation formula for a curved beam. It is noted that the test piece to be used is not limited to the one shown in FIG. 7 and may be any test piece having a different shape.

Suppose that a fiber stress on the convex surface of the test piece shown in FIG. 7 is $\sigma_1$ and a fiber stress on the concave surface is $\sigma_2$, then, $\sigma_1$ and $\sigma_2$ are determined by the following formula (JSME Mechanical Engineer's Handbook, A4-strength of materials, A4-40). Here, N indicates an axial force of a cross section including the axis of the annular test piece, A indicates a cross-sectional area, $e_1$ indicates an outer radius, $e_2$ indicates an inner radius, and κ is a section modulus of the curbed beam.

$$\sigma_1 = (N/A) + \{M/(A\rho_o)\}[1 + e_1/\{\kappa(\rho_o + e_1)\}]$$

$$\sigma_2 = (N/A) + \{M/(A\rho_o)\}[1 - e_2/\{\kappa(\rho_o - e_2)\}]$$

$$\kappa = -(1/A)\int A\{\eta/(\rho_o + \eta)\}dA$$

(5) Rolling Fatigue Test

Test conditions for a rolling fatigue life test are shown in Table 2.

Figure 8A:
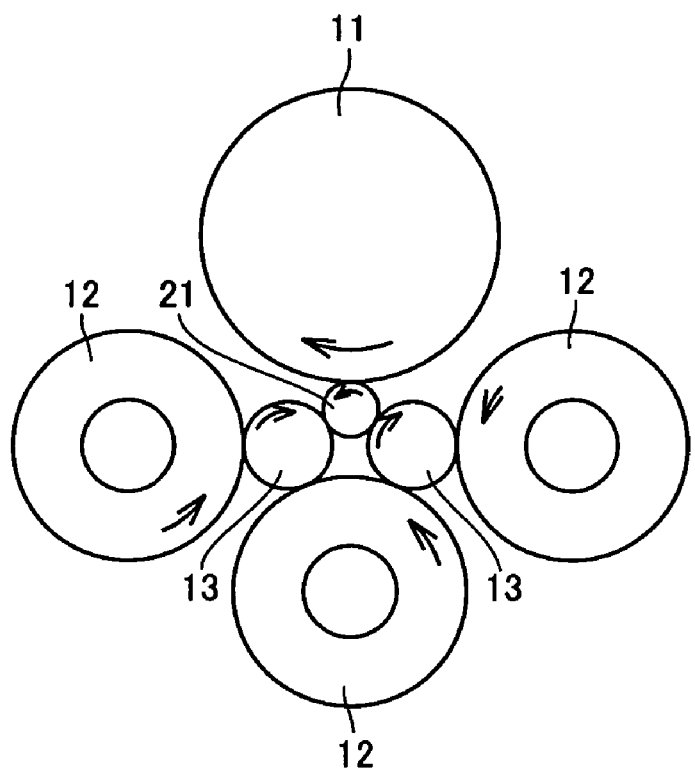
FIG. 8A is a schematic front view of a rolling contact fatigue life tester.
Figure 8B:
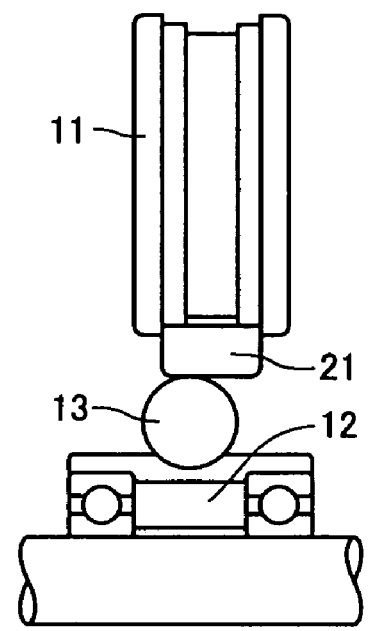
FIG. 8B is a schematic side view thereof.

Referring to FIGS. 8A and 8B, a test piece 21 undergoing the rolling fatigue life test was driven by a driving roll 11 to rotate while being in contact with balls 13. Balls 13 were (¾)" balls guided by a guiding roll 12 to roll. Balls 13 exerted a high surface pressure on test piece 21 while test piece 21 also exerted a high surface pressure on balls 13.

II. Results of Tests for Example 1

(1) Amount of Hydrogen

The conventional carbonitrided sample without being additionally processed has a considerably large hydrogen amount of 0.72 ppm. A reason therefor is considered that ammonia ($NH_3$) contained in the atmosphere in the carbonitriding process is decomposed and then hydrogen enters the steel. On the other hand, the hydrogen amount of samples B-D is reduced to 0.37-0.40 ppm and thus almost a half of that of the conventional sample. This amount of hydrogen is substantially equal to that of the normal quenched sample.

The above-mentioned reduction of the hydrogen amount can lessen the degree of embrittlement of the steel that is due to hydrogen in the solid solution. In other words, by the reduction of the hydrogen amount, the Charpy impact value of samples B-D of the present invention is remarkably improved.

(2) Crystal Grain Size

Regarding the crystal grain size, samples that are secondary quenched at a temperature lower than the quenching temperature in the carbonitriding process (primary quenching), namely samples B-D have austenite grains which are remarkably made fine, i.e., crystal grain size number is 11-12. Samples E and F as well as the conventional carbonitrided sample and the normal quenched sample have austenite grains with the crystal grain size number of 10, which means that the crystal grain size of samples E and F is greater than that of samples B-D of the present invention.

(3) Charpy Impact Test

Table 1 shows that the Charpy impact value of the conventional carbonitrided sample is 5.33 J/cm² while that of samples B-D of the present invention is higher, ranging from 6.30 to 6.65 J/cm². It is also seen from this that a lower secondary quenching temperature leads to a higher Charpy impact value. The normal quenched sample has a high Charpy impact value of 6.70 J/cm².

(4) Measurement of Fracture Stress

The fracture stress corresponds to anti-crack strength. It is seen from Table 1 that the fracture stress of the conventional carbonitrided sample is 2330 MPa. On the other hand, the fracture stress of samples B-D is improved to 2650-2840 MPa. The normal quenched sample has a fracture stress of 2770 MPa which is in the range of the fracture stress of samples B-F. It is considered that the reduction in hydrogen content greatly contributes to the improved anti-crack strength of samples B-D as well as the reduction in size of austenite crystal grains.

(5) Rolling Fatigue Test

According to Table 1, the normal quenched sample has the shortest rolling fatigue life ($L_{10}$) due to the absence of nitrogen enriched layer in the surface layer. In contrast, the rolling fatigue life of the conventional carbonitrided sample is 3.1 times as long as that of the normal quenched sample. The rolling fatigue life of samples B-D is remarkably improved as compared with the conventional carbonitrided sample. Samples E and F of the present invention have the rolling fatigue life almost equal to that of the conventional carbonitrided sample.

In summary, samples B-D of the present invention have the lower hydrogen content, finer austenite crystal grains with the crystal grain size number of at least 11, and improved Charpy impact value, anti-crack strength and rolling fatigue life.

Example 2

Example 2 of the present invention is now described. On the following samples X, Y and Z, a series of tests was conducted. A material to be heat-treated that was employed commonly to samples X-Z was JIS-SUJ2 (1.0 wt % of C-0.25 wt % of Si-0.4 wt % of Mn-1.5 wt % of Cr). Samples X-Z were each processed through the following procedure.

Sample X—comparative example: normal quenching only (without carbonitriding)

Sample Y—comparative example: quenching directly after carbonitriding (conventional carbonitriding and quenching) Carbonitriding was conducted at 845° C. held for 150 minutes. The atmosphere in the carbonitriding process was a mixture of RX gas and ammonia gas.

Sample Z—example of the present invention: A bearing material was processed following the heat treatment pattern shown in FIG. 3. Carbonitriding was conducted at 845° C. held for 150 minutes. The atmosphere in the carbonitriding process was a mixture of RX gas and ammonia gas. Final quenching temperature was 800° C.

(1) Rolling Fatigue Life

Test conditions and the test device for the rolling fatigue life test are as shown in Table 2 and FIGS. 8A and 8B. Results of the rolling fatigue life test are shown in Table 3.

TABLE 2

| | |
|---|---|
| test piece | φ 12 × L22 cylindrical test piece |
| number of tested pieces | 10 |
| counterpart steel ball | ¾" (19.05 mm) |
| contact surface pressure | 5.88 GPa |
| load speed | 46240 cpm |
| lubricating oil | turbine VG68 - forced circulation lubrication |

TABLE 3

| sample | life (load count) | | relative $L_{10}$ |
|---|---|---|---|
| | $L_{10}$ (×10⁴ times) | $L_{10}$ (×10⁴ times) | |
| X | 8017 | 18648 | 1.0 |
| Y | 24656 | 33974 | 3.1 |
| Z | 43244 | 69031 | 5.4 |

According to Table 3, sample Y which is a comparative example has a rolling fatigue life ($L_{10}$ life: one out of ten test pieces being damaged) that is 3.1 times as long as that of sample X which is also a comparative example and undergoes normal quenching only, and thus it is seen that the effect of extending the life is obtained through the carbonitriding process. In contrast, sample Z of the present invention has a longer life which is 1.74 times as long as that of sample Y and 5.4 times as long as that of sample X. It is considered that this improvement is obtained mainly from the fine microstructure.

(2) Charpy Impact Test

A Charpy impact test was conducted by using a U-notch test piece defined by JIS Z 2242 mentioned above. Test results are shown in Table 4.

TABLE 4

| sample | Charpy impact value (J/cm²) | relative impact value |
|---|---|---|
| X | 6.7 | 1.0 |
| Y | 5.3 | 0.8 |
| Z | 6.7 | 1.0 |

Sample Y (comparative example) having undergone carbonitriding has a Charpy impact value which is not larger than that of sample X (comparative example) having undergone normal quenching, while sample Z has a Charpy impact value equivalent to that of sample X.

(3) Static Fracture Toughness Test

Figure 9:
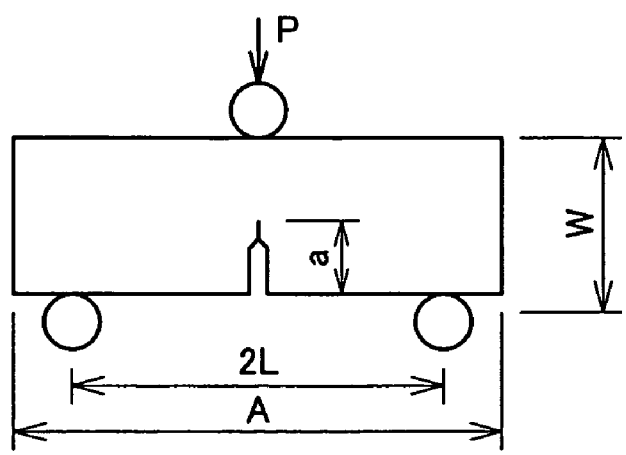
FIG. 9 is a sample used in a static fracture toughness test.

In the notch of the test piece shown In FIG. 9, a pre-crack of approximately 1 mm was made, thereafter a static load by three-point bending was added, and then a fracture load P was determined. Using the following formula (I), a fracture toughness value ($K_{Ic}$ value) was calculated. Results of the test are shown in Table 5.

$$K_{Ic}=(PL\sqrt{a}/BW^2)\{5.8-9.2(a/W)+(a/W)^2-75.3(a/W)^3+77.5(a/W)^4\} \quad (I)$$

TABLE 5

| sample | number tested | $K_1C$ (MPa√m) | relative $K_1C$ |
|---|---|---|---|
| A | 3 | 16.3 | 1.0 |
| B | 3 | 16.1 | 1.0 |
| C | 3 | 18.9 | 1.2 |

As the previously introduced crack has a depth greater than the depth of the nitrogen enriched layer and thus the same results are obtained for samples X and Y (comparative examples), while the result for sample Z (example of the present invention) is approximately 1.2 times as high as that of the comparative examples.

(4) Static-pressure Fracture-Strength Test (Measurement of Fracture Stress)

A static-pressure fracture-strength test piece as shown in FIG. 7 described above was used. A load was exerted in direction P in the figure to conduct a static-pressure fracture-strength test. Test results are shown in Table 6.

TABLE 6

| sample | number tested | static fracture strength (kgf) | relative static fracture strength |
|---|---|---|---|
| A | 3 | 4200 | 1.00 |
| B | 3 | 3500 | 0.84 |
| C | 3 | 4300 | 1.03 |

Sample Y having been carbonitrided has a strength somewhat smaller than that of sample X having undergone normal quenching, while sample Z of the present invention has an improved static-pressure fracture-strength compared with sample Y and is thus equivalent to that of sample X.

(5) Rate of Secular Dimensional Variation

Table 7 shows the rate of secular dimensional variation measured under the conditions of 130° C. (holding temperature) and 500 hours (holding time), together with the surface hardness and the amount of retained austenite (0.1 mm depth).

TABLE 7

| sample | number tested | surface hardness (HRC) | retained γ (%) | rate of dimensional change (×10$^{-5}$) | relative rate of dimensional change*[)] |
|---|---|---|---|---|---|
| A | 3 | 62.5 | 9.0 | 18 | 1.0 |
| B | 3 | 63.6 | 28.0 | 35 | 1.9 |
| C | 3 | 60.0 | 11.3 | 22 | 1.2 |

*[)]smaller is superior

As compared with the rate of dimensional variation of sample Y having a large amount of retained austenite, sample Z of the present invention has the smaller rate of dimensional variation due to the lower amount of retained austenite which is one-half or less.

(6) Life Test Under Contaminated Lubricant Condition

Ball bearing 6206 was used to evaluate the rolling fatigue life under a contaminated lubricant condition having a predetermined amount of normal contaminants mixed therein. Test conditions are shown in Table 8 and test results are shown in Table 9.

TABLE 8

| load | Fr = 6.86 kN |
|---|---|
| contact surface pressure | Pmax = 3.2 Gpa |
| rate of rotation | 2000 rpm |
| lubricant | turbine 56 - oil bath lubrication |
| amount of contaminant | 0.4 g/1000 cc |
| contaminant | grain size: 100-180 μm, hardness: Hv800 |

TABLE 9

| sample | $L_{10}$ life (h) | relative $L_{10}$ |
|---|---|---|
| X | 20.0 | 1.0 |
| Y | 50.2 | 2.5 |
| Z | 74.0 | 3.7 |

Sample Y having undergone conventional carbonitriding has a lifetime which is approximately 2.5 times as long as that of sample X, and sample Z of the present invention has a lifetime which is approximately 3.7 times as long as that of sample A. While sample Z of the present invention has a smaller amount of retained austenite than that of sample Y of the comparative example, sample Z has a long lifetime because of influences of entering nitrogen and the fine microstructure.

It is accordingly seen from the above-discussed results that, sample Z of the present invention, namely a bearing component produced by the heat treatment method of the present invention can simultaneously achieve three goals: extension of the rolling fatigue life that has been difficult to achieve by the conventional carbonitriding, improvement in crack strength and reduction of the rate of secular dimensional variation.

Note that while in the first and second embodiments differential support structure 1 is provided by using tapered roller bearings 1a-1d or deep groove ball bearings 7a-7d, the present invention is not limited thereto and for example an angular contact ball bearing, a cylindrical roller bearing or the like may be used.

While in the first embodiment outer ring 2a (2b) is distinct from external peripheral portion 19a (19b), the present invention is not limited thereto and outer ring 2a (2b) may be integrated into external peripheral portion 19a (19b). Furthermore while in the first embodiment inner ring 3a (3b) is distinct from external peripheral portion 19a (19b), the present invention is not limited thereto and outer ring 3a (3b) may be integrated into external peripheral portion 19a (19b).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A structure supporting a differential rotatably, comprising:
   an inner ring arranged at said differential;
   an outer ring arranged at an external peripheral portion formed to surround said differential; and
   a rolling element rolling between said inner ring and said outer ring, wherein at least one of said inner ring, said outer ring and said rolling element has a carbo-nitrided layer and has an austenite grain size number falling within a range exceeding 10,
   wherein steel is carbo-nitrided at a temperature higher than an $A_1$ transformation point and then cooled to a temperature lower than said $A_1$ transformation point, and the steel is subsequently reheated to a range of temperature of no less than said $A_1$ transformation point and less than said temperature applied to carbo-nitride the steel and the steel is then quenched to produce at least any one of said inner ring, said outer ring and said rolling element, and wherein at least one of the inner ring, the outer ring and the rolling element contains carbon in an amount of 0.95%-1.10%, silicon in an amount of 0.15%-0.35%, manganese in an amount of at most 0.5%, phosphorus in an amount of at most 0.025%, sulfur in an amount of at most 0.025%, chromium in an amount of 1.30%-1.60%, and molybdenum in an amount of less than 0.08%, with the remainder formed of Fe and an unavoidable impurity.

2. The structure of claim 1, wherein said differential is supported by a tapered roller bearing rotatably.

3. The structure of claim 1, wherein said differential is supported by a deep groove ball bearing rotatably.

4. A structure supporting a differential rotatably, comprising:
   an inner ring arranged at said differential;
   an outer ring arranged at an external peripheral portion formed to surround said differential; and
   a rolling element rolling between said inner ring and said outer ring, wherein at least one of said inner ring, said outer ring and said rolling element has a carbo-nitrided layer and provides a fracture stress value of no less than 2650 MPa,
   wherein steel is carbo-nitrided at a temperature higher than an $A_1$ transformation point and then cooled to a temperature lower than said $A_1$ transformation point, and the steel is subsequently reheated to a range of temperature of no less than said $A_1$ transformation point and less than said temperature applied to carbo-nitride the steel and the steel is then quenched to produce at least any one of said inner ring, said outer ring and said rolling element, and
   wherein at least one of the inner ring, the outer ring and the rolling element contains carbon in an amount of 0.95%-1.10%, silicon in an amount of 0.15%-0.35%, manganese in an amount of at most 0.5%, phosphorus in an amount of at most 0.025%, sulfur in an amount of at most 0.025%, chromium in an amount of 1.30%-1.60%, and molybdenum in an amount of less than 0.08%, with the remainder formed of Fe and an unavoidable impurity.

5. The structure of claim 4, wherein said differential is supported by a tapered roller bearing rotatably.

6. The structure of claim 4, wherein said differential is supported by a deep groove ball bearing rotatably.

7. A structure supporting a differential rotatably, comprising:
   an inner ring arranged at said differential;
   an outer ring arranged at an external peripheral portion formed to surround said differential; and
   a rolling element rolling between said inner ring and said outer ring, wherein at least one of said inner ring, said outer ring and said rolling element has a carbo-nitrided layer and has a hydrogen content of no more than 0.5 ppm,
   wherein steel is carbo-nitrided at a temperature higher than an $A_1$ transformation point and then cooled to a temperature lower than said $A_1$ transformation point, and the steel is subsequently reheated to a range of temperature of no less than said $A_1$ transformation point and less than said temperature applied to carbo-nitride the steel and the steel is then quenched to produce at least any one of said inner ring, said outer ring and said rolling element, and
   wherein at least one of the inner ring, the outer ring and the rolling element contains carbon in an amount of 0.95%-1.10%, silicon in an amount of 0.15%-0.35%, manganese in an amount of at most 0.5%, phosphorus in an amount of at most 0.025%, sulfur in an amount of at most 0.025%, chromium in an amount of 1.30%-1.60%, and molybdenum in an amount of less than 0.08%, with the remainder formed of Fe and an unavoidable impurity.

8. The structure of claim 7, wherein said differential is supported by a tapered roller bearing rotatably.

9. The structure of claim 7, wherein said differential is supported by a deep groove ball bearing rotatably.

10. A component of a differential including a gear capable of operating two wheels at different rates, respectively, and a shaft linked to said gear, said component having a nitrogen enriched layer and an austenite grain size number exceeding 10,
    wherein steel is carbo-nitrided at a temperature higher than an $A_1$ transformation point and then cooled to a temperature lower than said $A_1$ transformation point, and the steel is subsequently reheated to a range of 790° C. to 830° C. and the steel is then quenched to produce said component, and
    wherein said component contains carbon in an amount of 0.95%-1.10%, silicon in an amount of 0.15%-0.35%, manganese in an amount of at most 0.5%, phosphorus in an amount of at most 0.025%, sulfur in an amount of at most 0.025%, chromium in an amount of 1.30%-1.60%, and molybdenum in an amount of less than 0.08%, with the remainder formed of Fe and an unavoidable impurity.

11. A component of a differential including a gear capable of operating two wheels at different rates, respectively, and a shaft linked to said gear, said component having a nitrogen enriched layer and providing a fracture stress value of no less than 2650 MPa,
    wherein steel is carbo-nitrided at a temperature higher than an $A_1$ transformation point and then cooled to a temperature lower than said $A_1$ transformation point, and the steel is subsequently reheated to a range of 790° C. to 830° C. and the steel is then quenched to produce said component, and
    wherein said component contains carbon in an amount of 0.95%-1.10%, silicon in an amount of 0.15%-0.35%, manganese in an amount of at most 0.5%, phosphorus in an amount of at most 0.025%, sulfur in an amount of at most 0.025%, chromium in an amount of 1.30%-1.60%, and molybdenum in an amount of less than 0.08%, with the remainder formed of Fe and an unavoidable impurity.

12. A component of a differential including a gear capable of operating two wheels at different rates, respectively, and a shaft linked to said gear, said component having a nitrogen enriched layer and a hydrogen content of no more than 0.5 ppm,
    wherein steel is carbo-nitrided at a temperature higher than an $A_1$ transformation point and then cooled to a temperature lower than said $A_1$ transformation point, and the steel is subsequently reheated to a range of 790° C. to 830° C. and the steel is then quenched to produce said component, and
    wherein said component contains carbon in an amount of 0.95%-1.10%, silicon in an amount of 0.15%-0.35%, manganese in an amount of at most 0.5%, phosphorus in an amount of at most 0.025%, sulfur in an amount of at most 0.025%, chromium in an amount of 1.30%-1.60%, and molybdenum in an amount of less than 0.08%, with the remainder formed of Fe and an unavoidable impurity.

* * * * *

UNITED STATES PATENT AND TRADEMARK OFFICE
CERTIFICATE OF CORRECTION

| | | |
|---|---|---|
| PATENT NO. | : 7,334,943 B2 | Page 1 of 1 |
| APPLICATION NO. | : 10/787263 | |
| DATED | : February 26, 2008 | |
| INVENTOR(S) | : Kouichi Okugami et al. | |

It is certified that error appears in the above-identified patent and that said Letters Patent is hereby corrected as shown below:

On the title page, before Item "(30) Foreign Application Priority Data", add Item --(63) Related U.S. Application Data, Continuation-in-part of application No. 10/714,596, filed on Nov. 18, 2003, now abandoned.--

Signed and Sealed this

Seventh Day of October, 2008

JON W. DUDAS
*Director of the United States Patent and Trademark Office*